(12) United States Patent
Oliveira et al.

(10) Patent No.: US 10,859,118 B2
(45) Date of Patent: Dec. 8, 2020

(54) SLEWING ROLLER BEARING WITH AT LEAST TWO ROWS OF ROLLER ELEMENTS

(71) Applicant: Aktiebolaget SKF, Gothenburg (SE)

(72) Inventors: Joshua Oliveira, Lucy-sur-cure (FR); Vincent Bredoire, Pourrain (FR)

(73) Assignee: Aktiebolaget SFK, Gothenburg (SE)

( * ) Notice: Subject to any disclaimer, the term of this patent is extended or adjusted under 35 U.S.C. 154(b) by 0 days.

(21) Appl. No.: 16/266,695

(22) Filed: Feb. 4, 2019

(65) Prior Publication Data
US 2019/0242434 A1 Aug. 8, 2019

(30) Foreign Application Priority Data
Feb. 6, 2018 (DE) .......................... 10 2018 201 820

(51) Int. Cl.
*F16C 33/58* (2006.01)
*F16C 19/38* (2006.01)
*F16C 43/06* (2006.01)
*F16C 33/60* (2006.01)

(52) U.S. Cl.
CPC .......... *F16C 33/585* (2013.01); *F16C 19/381* (2013.01); *F16C 33/605* (2013.01); *F16C 43/06* (2013.01); *F16C 2300/14* (2013.01)

(58) Field of Classification Search
CPC .... F16C 19/188; F16C 19/381; F16C 33/585; F16C 33/60; F16C 33/605; F16C 43/04; F16C 43/06; F16C 2300/14
See application file for complete search history.

(56) References Cited

U.S. PATENT DOCUMENTS

| 8,931,959 | B2 | 1/2015 | Noirot | |
|---|---|---|---|---|
| 9,494,197 | B2* | 11/2016 | Capoldi | F16C 33/76 |
| 9,810,266 | B2* | 11/2017 | Capoldi | F16C 33/7896 |
| 2016/0327097 | A1* | 11/2016 | Russ | F16C 19/381 |

FOREIGN PATENT DOCUMENTS

| EP | 2097651 B1 | 10/2012 |
|---|---|---|
| FR | 2694610 A1 | 2/1994 |
| GB | 2269638 A | 2/1994 |
| WO | WO2008/058729 * | 5/2008 |

* cited by examiner

*Primary Examiner* — James Pilkington
(74) *Attorney, Agent, or Firm* — Garcia-Zamor Intellectual Property Law; Ruy Garcia-Zamor; Bryan Peckjian

(57) ABSTRACT

A slewing bearing having an inner ring, an outer ring provided with a first part and a second part that are axially assembled one to another, at least one axial thrust between the inner ring and the first part of outer ring that can transmit axial forces, and a radial thrust between the inner ring and the second part of outer ring which can transmit radial forces is provided. Roller elements of radial thrust are arranged in an annular groove that extends from a bore of second part of outer ring. At least one mounting orifice axially extends from the annular groove, has dimensions such that at least one roller element can pass through the mounting orifice, and is closed by a plug.

18 Claims, 4 Drawing Sheets

SLEWING ROLLER BEARING WITH AT LEAST TWO ROWS OF ROLLER ELEMENTS

CROSS-REFERENCE

This application claims priority to German patent application no. 102018201820.0 filed on Feb. 6, 2018, the contents of which are fully incorporated herein by reference.

TECHNOLOGICAL FIELD

The invention relates to the field of roller bearings, in particular roller bearings of large diameter for use in mining extraction machines, tunnel boring machines such as a tunneler, a wind turbine or any other rotating applications of large dimensions.

BACKGROUND

Roller bearings typically comprise an inner ring, an outer ring, and at least two rows of roller elements arranged between the rings. Roller bearings of large diameter are generally loaded both radially and axially with relatively large loads. In this case, reference is made to an orientation roller bearing or slewing roller bearing.

Patent application FR-A1-2 694 610 describes a slewing roller bearing comprising three row of rollers arranged between the inner and outer rings, and wherein two rows make it possible to withstand axial forces. The third row of rollers makes it possible to withstand radial forces, and is arranged between the cylindrical outer surface of the inner ring, and a groove formed in the bore in the outer ring.

The inner ring is integral, and the outer ring is provided with two outer ring parts which are axially assembled to one another. A first outer ring part is provided with an annular radial raceway for rollers forming a first axial thrust. A second outer ring part is provided with an annular radial raceway for rollers forming a second axial thrust, and a cylindrical raceway for rollers forming a radial thrust. The cylindrical raceway consists in an axial base wall of a groove. The groove is axially delimited by a radial lateral wall, and is axially open towards the first outer ring part so as to facilitate the insertion of rollers within the groove. A radial surface of the first outer ring part closes this open radial side of groove and forms a radial lateral wall to delimit the groove. A similar arrangement is described in EP-B1-2 097 651, for example.

However, the first outer ring part is L-shaped since a recess is designed to receive axially the entire axial length of the rollers forming the first axial thrust. An annular ring of substantial rectangular shape in axial cross section is machined to remove material so as to form the recess dedicated to receive the rollers. This process causes material waste, and then financial losses to the manufacturer.

It is therefore desirable that a slewing roller bearing comprises an outer ring arrangement of reduced manufacturing cost, and easy to assemble.

SUMMARY

The aim of the invention is to solve the above difficulties.

To this end, the invention relates to a slewing roller bearing comprising an inner ring, and an outer ring provided with at least a first part and a second part that are axially assembled one to another, the parts being each provided with cooperating radial mounting surfaces, the rings being concentric around a central axis.

The slewing roller bearing comprises at least one row of roller elements arranged between the inner ring and the first part of outer ring to form an axial thrust which can transmit axial forces.

The slewing roller bearing further comprises at least one row of roller elements arranged between the inner ring and the second part of outer ring to form a radial thrust which can transmit radial forces. The roller elements are arranged in an annular groove that extends from a bore of second part of outer ring.

According to the invention, the second part of outer ring comprises at least one mounting orifice that axially extends from the annular groove, the mounting orifice opening out on the radial mounting surface of the second part. Each of the at least one mounting orifice has dimensions such that at least one roller element can pass through the mounting orifice. Each of the at least one mounting orifice is closed by a plug.

According to further aspects of the invention which are advantageous but not compulsory, such a slewing roller bearing may incorporate one or several of the following features:
- Plug comprises a radial end surface which is flush with the mounting surface of second part of outer ring, such as to prevent surface discontinuity.
- Second part of outer ring comprises a plurality of mounting orifices.
- Mounting orifices are circumferentially equally spaced.
- The at least one mounting orifice circumferentially extends over an angular sector such that a plurality of circumferentially adjacent rollers can pass through the mounting orifice.
- Mounting orifice is annular, the plug being an annular ring.
- Mounting surface of second part of outer ring comprises at least one recess, plug comprising at least one radially extending protruding portion arranged within the recess.
- Plug is made of metal material, for example steel.
- First part of outer ring comprises a annular radial surface provided with the radial mounting surface on outer radial side, and an outer radial raceway for roller elements on inner radial side.
- The annular radial surface is stepped.
- Slewing roller bearing comprises a second axial thrust with roller elements that is provided axially opposite to the other axial thrust with respect to the radial thrust.
- Outer ring is provided with a third part provided with a radial mounting surface that is axially assembled to a second radial mounting surface of the second part, the third part being axially opposite to the first part and comprising a raceway for roller elements of the second axial thrust.

BRIEF DESCRIPTION OF THE DRAWINGS

The invention will now be explained in correspondence with the annexed figures, as illustrative examples, without restricting the object of the invention. In the annexed figures.

DETAILED DESCRIPTION

Figure 1:
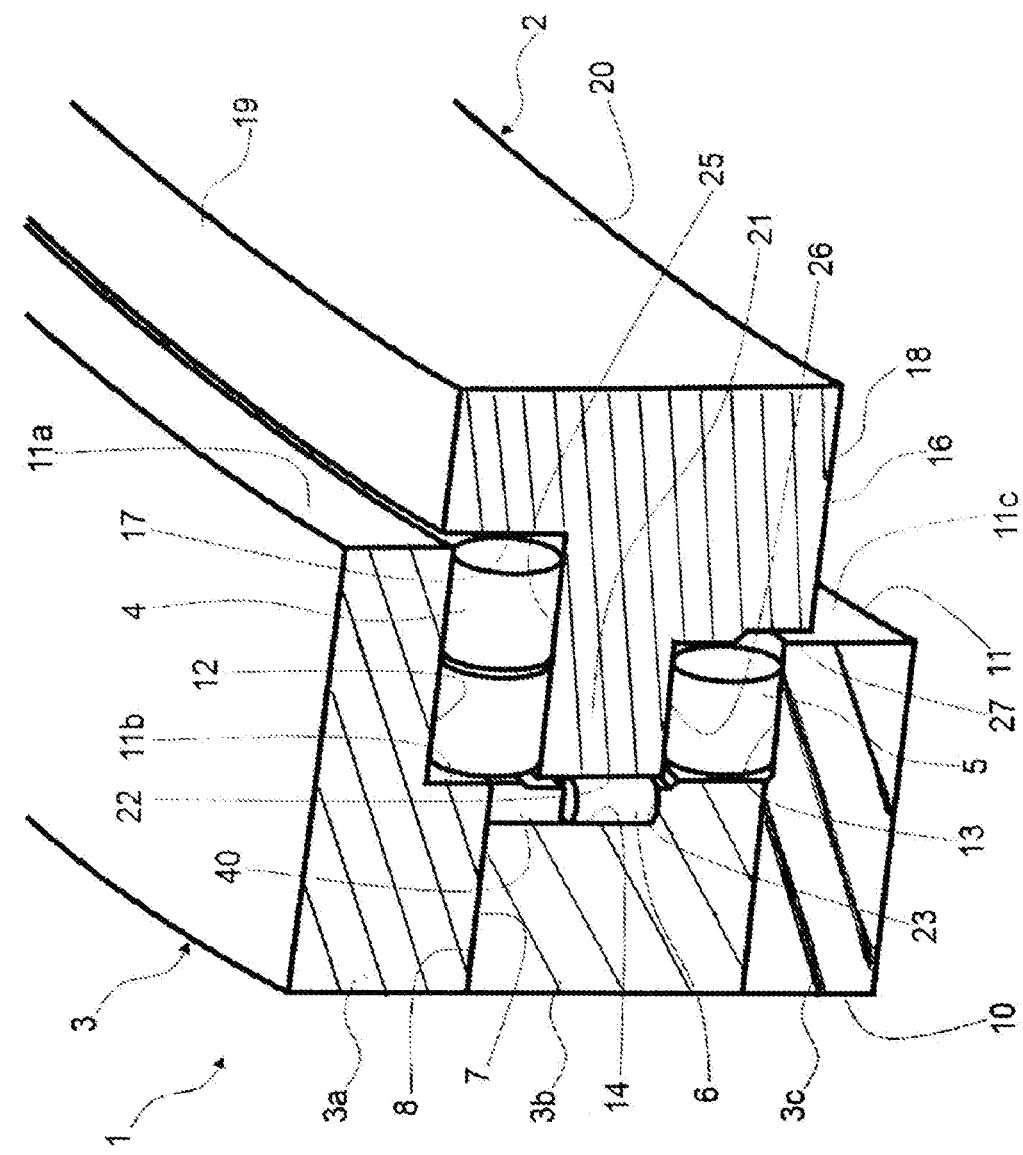
FIG. 1 is a perspective sectional view of a slewing roller bearing according to a first embodiment of the invention.

FIG. 1 shows a slewing roller bearing 1 with a large diameter which can be used in particular in tunnel boring machines such as a tunneler, a wind turbine or any other rotating applications of large dimensions.

The slewing roller bearing 1 with a central axis comprises an inner ring 2, an outer ring 3, rows of rollers 4, 5 arranged between the the rings 2, 3 in order to form an axial thrust which can transmit axial forces, and one row of rollers 6 arranged between the the rings 2, 3 in order to form a radial thrust which can transmit radial forces.

The inner ring 2 and the outer ring 3 are concentric, and extend axially along the axis of rotation of bearing 1.

As one embodiment, the outer ring 3 is made of two main parts 3a, 3b, 3c which are assembled to one another by any appropriate means, for example by being bolted together (not illustrated).

The outer ring 3 comprises a cylindrical outer surface 10 and a stepped bore 11 on which there are formed first, second and third raceways 12, 13 and 14 respectively. The outer ring 3 has a C-shape with the first part 3a forming an upper annular radial portion, the second part 3b forming a cylindrical middle portion, and the third part 3c forming a lower annular radial portion. The stepped bore 11 defines a first, second and third bore portions 11a, 11b and 11c, respectively.

The first part 3a comprises a lower annular radial surface 7 forming a mounting surface, and the second part 3b comprises an upper annular radial surface 8 forming a mounting surface, the surfaces 7, 8 being in axial contact one to another when the parts are assembled together.

In the embodiment of FIG. 1, the third part 3c is provided with a radial mounting surface 9 that is axially assembled to a second radial mounting surface 8a of the second part 3b. As an alternate not shown, the second part 3b and the third part 3c may be formed integral of substantial L-shape.

The first raceway 12 is provided to the first part 3a. Raceway 12 is in the form of an annular radial surface which is in linear contact with two row of rollers 4. The radial raceway 12 is extended, at the level of an edge with a large diameter, by the cylindrical axial bore portion 11b of the stepped bore 11 which delimits locally the third raceway 14.

The third raceway 14 is provided to the second part 3b. Raceway 14 is arranged in a groove 15 formed in the bore portion 11b and extends radially towards the exterior of the bearing 1. The axial base wall of the groove 15 is offset radially towards the exterior relative to the bore portion 11b, and forms the third raceway 14. The third raceway 14 is in the form of an annular axial surface which is in linear contact with rollers 6.

The bore portion 11b is extended radially, on the side opposite to the first raceway 12, by the third part 3c. Second raceway 13 is provided to the part 3c and is in the form of an annular radial surface in linear contact with rollers 5.

The inner ring 2 comprises a cylindrical annular body 16 radially delimited by a cylindrical bore 20 and an outer cylindrical surface 17, and axially delimited by two opposite lateral radial surfaces 18, 19. The cylindrical bore 20 may be designed to cooperate with a corresponding structure or machine or frame (not illustrated).

The cylindrical annular body 16 comprises an outwardly projecting portion 21. The portion 21 protrudes radially from the outer cylindrical surface 17 towards the outer ring 3.

Portion 21 is axially arranged between the first and third parts 3a and 3c of the outer ring 3, and more precisely axially arranged between the annular radial surfaces forming the first and second raceways 12, 13 respectively. The portion 21 is radially delimited by an outer cylindrical surface 22 that is radially opposite to the third raceway 14 of outer ring 3, and forming an axial raceway for rollers 6 radially arranged between the raceways 14 and 22.

The rollers 6 are arranged between the outer cylindrical surface 22 of inner ring 2 forming an inner axial raceway for the rollers 6, and the axial base wall 14 of annular groove 15 provided to the bore of second part 3b of outer ring 3, in order to form a radial thrust which can transmit radial forces. Annular groove 15 is radially delimited by the cylindrical axial base wall 14 and outer cylindrical surface 22 of inner ring 2, and is axially delimited by two radial lateral walls 23, 24 so as to limit the axial displacement of the rollers 6.

Outwardly projecting portion 21 is axially delimited by an upper lateral radial surface 25 that is axially opposite to the first raceway 12 of outer ring 3, and forms a radial raceway for two radially adjacent rows of rollers 4 axially arranged between the raceways 12 and 23.

The two rows of rollers 4 are arranged between the annular radial surface 25 of the inner ring 2 that forms a lower radial raceway for rollers 4, and the annular radial surface 12 of the first part 3a of outer ring 3 that forms an upper radial raceway for rollers 4, in order to form a first axial thrust which can transmit axial forces. Alternatively, the first axial thrust may comprise only one row of rollers 4.

Outwardly projecting portion 21 is further axially delimited by a lower radial surface 26 that is axially opposite to the second raceway 13 of outer ring 3, and forms a radial raceway for one row of rollers 5 axially arranged between the raceways 13 and 24.

The rollers 5 are arranged between the annular radial surface 26 of the inner ring 2 that forms an upper radial raceway for rollers 5, and the annular radial surface 13 of the third part 3c of outer ring 3 that forms a lower radial raceway for rollers 5, in order to form a second axial thrust which can transmit axial forces. Alternatively, the second axial thrust may comprise two rows of rollers 5.

The raceway 26 of outwardly projecting portion 21 and the lower lateral radial surface 18 of cylindrical annular body 16 are axially offset. The raceway 25 of outwardly projecting portion 21 and the upper lateral radial surface 19 of cylindrical annular body 16 are axially offset. The raceway 22 of outwardly projecting portion 21 and the outer cylindrical surface 17 of cylindrical annular body 16 are radially offset.

The bore portion 11b of the stepped bore 11 of outer ring 3 and the outer cylindrical surface 17 of inner ring 2 form radial abutments for the rollers 4 arranged between the raceways 12 and 23, and also form radial abutments for the rollers 5 arranged between the raceways 13 and 24.

Figure 2:
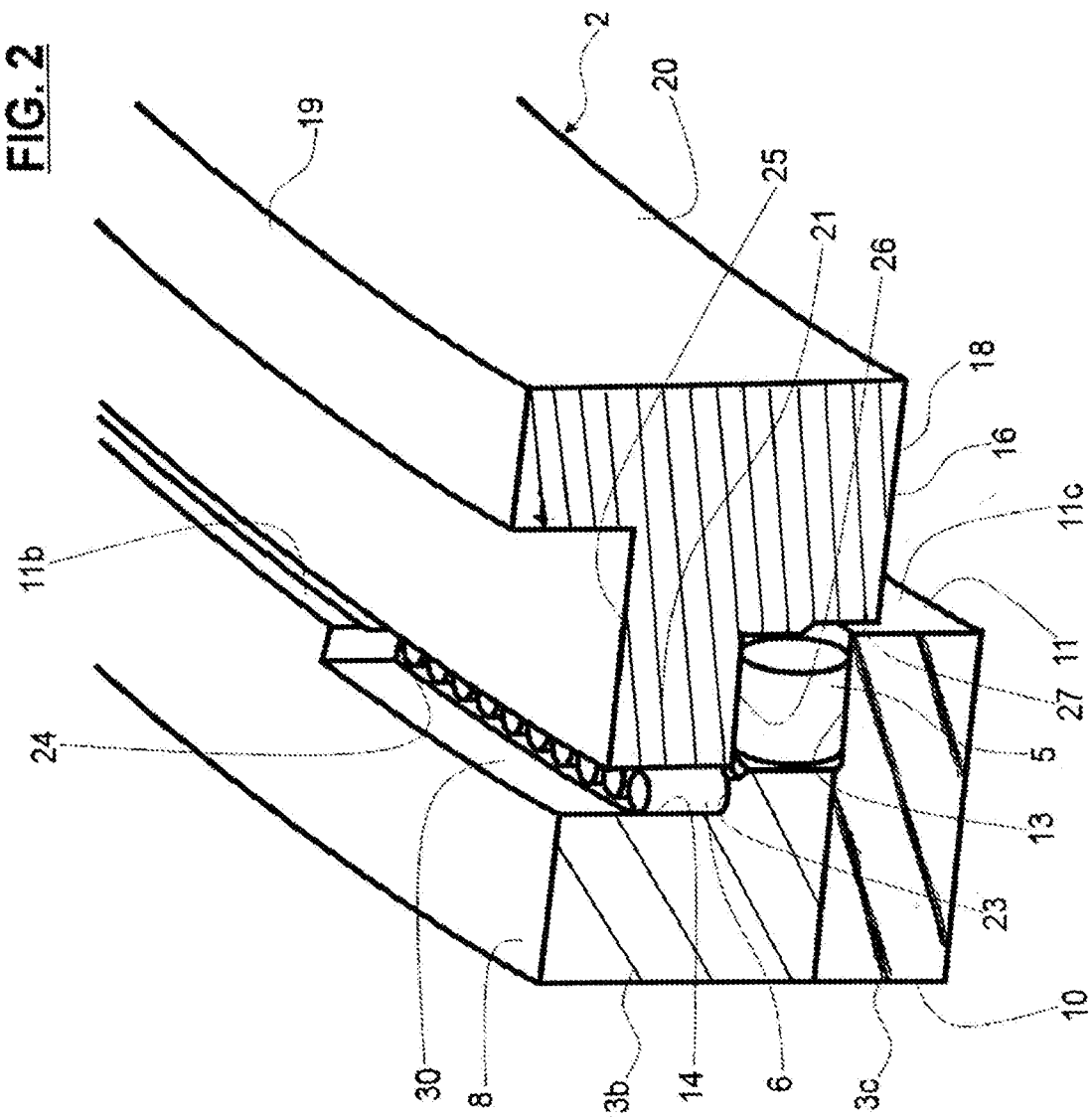
FIGS. 2 and 3 are perspective sectional views of the slewing roller bearing of FIG. 1 during assembly steps.

According to the invention, the second part 3b of outer ring 3 comprises at least one mounting orifice 30 that axially extends from one radial lateral wall 24 of the annular groove, the mounting orifice 30 opening onto the radial mounting surface 8 of the second part 3b. Each of the at least one mounting orifice 30 has dimensions such that at least one roller 6 can pass through the mounting orifice 30. The FIG. 2 illustrates the slewing roller bearing in a pre-assembled state, without the first part 3a of outer ring 3. A plurality of rollers 6 can advantageously be fit through the mounting orifice 30, such as to facilitate the manual handling and fitting of rollers 30 during the bearing assembly.

Alternatively, the mounting orifice 30 may be of dimensions such that only one roller 6 can be fitted within.

Each of the at least one mounting orifice 30 is closed by a plug 40 that forms locally on one axial side a portion of the lateral wall 24, and on the opposite axial side a portion of the mounting surface 8. Advantageously, the plug 40 comprises a radial end surface which is flush with the mounting surface 8 of second part 3*b* of outer ring 3, such as to prevent surface discontinuity. Radial end surface of plug 40 is in axial contact with the radial mounting surface 7 when the first and second parts 3*a*, 3*b* of outer ring 3 are assembled together.

Furthermore, the plug 40 forms locally on one radial side a portion of inner bore 11*b* of second part 3*b* of outer ring 3 that limits the radial displacement of roller elements of the axial thrust, and on the opposite radial side a contact surface with the second part 3*b* of outer ring 3.

Figure 3:
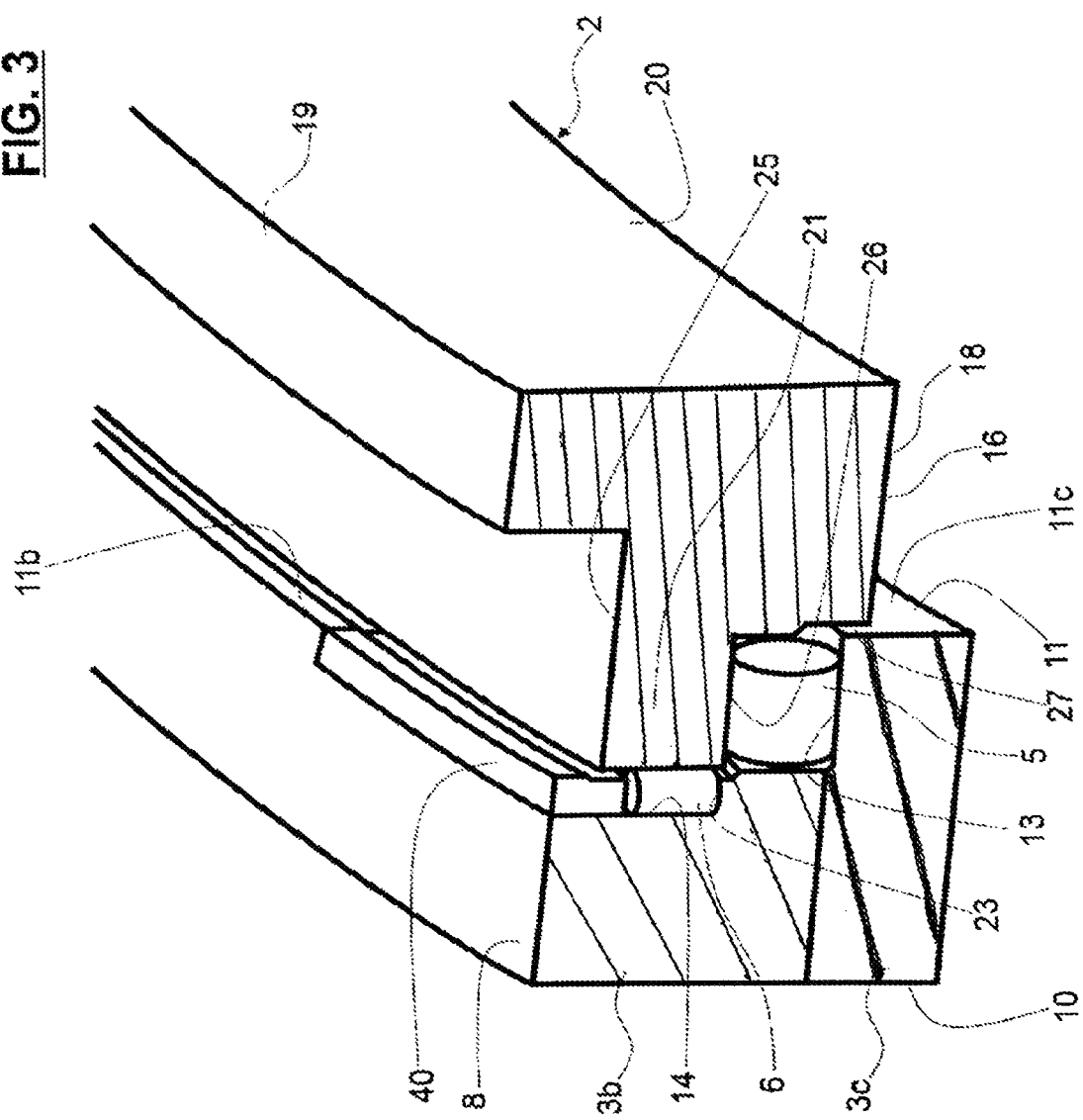

The FIG. 3 illustrates the slewing roller bearing in a pre-assembled state with the plug 40 fitted in the mounting orifice 30, but without the first part 3*a* of outer ring 3. Only one mounting orifice 30 with plug is illustrated, but the second part 3*b* of outer ring 3 may comprise a plurality of mounting orifices 30. Advantageously, the mounting orifices may be circumferentially equally spaced. Alternatively, the mounting orifice may be annular, the plug being an annular ring.

Advantageously, the plug 40 is made of metal material, for example steel.

In the present embodiment, the first part 3*a* of outer ring 3 comprises a annular radial surface provided with the radial mounting surface 8 on outer radial side, and an outer radial raceway 12 for rollers 6 on inner radial side, the annular radial surface being stepped. When machining an annular ring to form the first part 3*a* of outer ring 3, only few material is removed and then wasted. Alternatively, the surface of first part 3*a* may not be stepped as in third part 3*c*.

On the contrary of the L-shaped outer ring parts known in prior art, the first part 3*a* according to the present invention is of substantial rectangular shape in cross-section and then is economic in material use, permitting to prevent financial losses to the manufacturer.

The bore portion 11*c* of the lower radial portion 3*c* of outer ring 3 is partly radially facing the outer cylindrical surface 17 of the cylindrical annular body 16 of inner ring 2. The bore portion 11*c* and outer cylindrical surface 17 are radially spaced by a bottom inter-ring space 27. Advantageously, the inter-ring space 27 may sealed by sealing means (not illustrated) to prevent the entry of exterior elements, such as dust, metal particles or water, inside inter-ring space 27, hence inside slewing roller bearing 1 and damaging its components.

Figure 4:
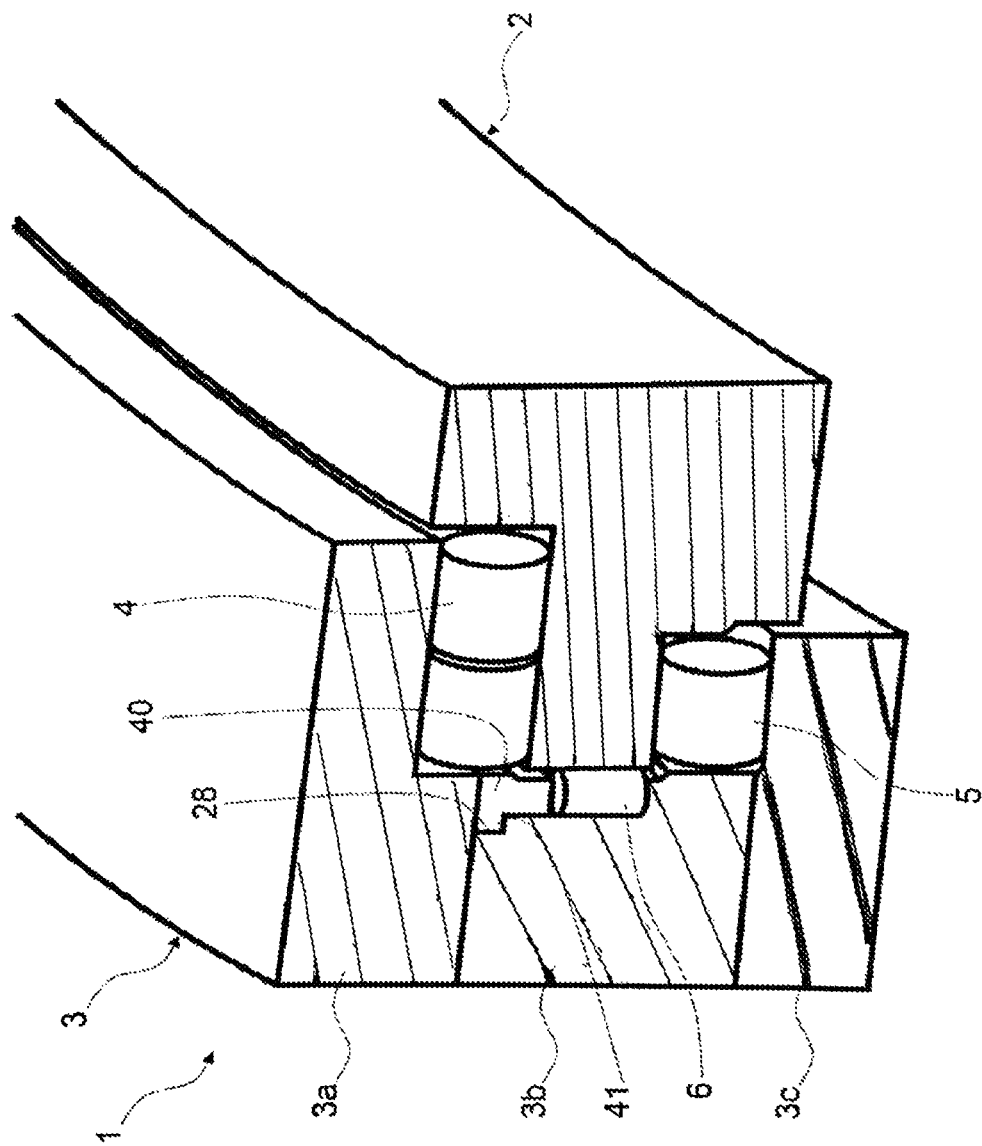
FIG. 4 is a perspective sectional view of a slewing roller bearing according to a second embodiment of the invention.

A second embodiment of the invention is illustrated in FIG. 4, wherein the same elements have the same references, and differs from the previous embodiment in that the plug 40 and the second part 3*b* of outer ring 3 are provided with retaining means.

In the illustrated embodiment, the mounting surface 8 of second part 3*b* of outer ring 3 comprises at least one recess 28, plug 40 comprising at least one radially extending protruding portion 41 arranged within the recess 28. The cooperation of the recess 28 with protrusion 41 permits to ensure maintain of the plug 40 with respect to the outer ring part 3*b* in one axial direction. The maintain of plug 40 in the opposite axial direction is ensured by the mounting surface 7 of first part 3*a*.

Plug 40 may comprise a plurality of protruding portions 41. Alternatively, plug may comprise only one protruding portion 41.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved slewing roller bearing.

Moreover, various features of the above-described representative examples, as well as the various independent and dependent claims below, may be combined in ways that are not specifically and explicitly enumerated in order to provide additional useful embodiments of the present teachings.

What is claimed is:

1. A slewing bearing comprising:
   an inner ring,
   an outer ring provided with at least a first part and a second part that are axially assembled one to another, the first part and the second part each provided with cooperating radial mounting surfaces, the inner ring and outer ring being concentric around a central axis,
   at least one row of roller elements arranged between the inner ring and the first part of the outer ring to form an axial thrust bearing which can transmit axial forces, and at least one row of roller elements arranged between the inner ring and the second part of the outer ring to form a radial thrust bearing which can transmit radial forces, the roller elements being arranged in an annular groove that extends from a bore of the second part of the outer ring, wherein
   the second part of the outer ring comprises at least one mounting orifice that axially extends from the annular groove, the mounting orifice opening out on the radial mounting surface of the second part, each of the at least one mounting orifice having dimensions such that at least one roller element can pass through the mounting orifice, each of the at least one mounting orifice being closed by a plug, and
   wherein the plug comprises a radial end surface that is flush with the mounting surface of second part of outer ring, such as to prevent surface discontinuity.

2. The slewing roller bearing according to claim 1, wherein the mounting orifice is annular, and the plug is an annular ring.

3. The slewing roller bearing according to claim 1, wherein the at least one mounting orifice circumferentially extends over an angular sector such that a plurality of circumferentially adjacent rollers can pass through the mounting orifice.

4. The slewing roller bearing according to claim 1, wherein the plug is made of metal material.

5. The slewing roller bearing according to claim 1, wherein the first part of outer ring comprises a stepped annular radial surface provided with the radial mounting surface on an outer radial side, and an outer radial raceway for roller elements on an inner radial side.

6. The slewing roller bearing according to claim 1, wherein the slewing roller bearing comprises a second axial thrust bearing with roller elements that is provided axially opposite to the other axial thrust bearing with respect to the radial thrust bearing.

7. The slewing roller bearing according to claim 6, wherein the outer ring is provided with a third part provided with a radial mounting surface that is axially assembled to a second radial mounting surface of the second part, the third part being axially opposite to the first part and comprising a raceway for roller elements of the second axial thrust bearing.

8. A slewing bearing comprising:
an inner ring,
an outer ring provided with at least a first part and a second part that are axially assembled one to another, the first part and the second part each provided with cooperating radial mounting surfaces, the inner ring and outer ring being concentric around a central axis,
at least one row of roller elements arranged between the inner ring and the first part of the outer ring to form an axial thrust bearing which can transmit axial forces, and at least one row of roller elements arranged between the inner ring and the second part of the outer ring to form a radial thrust bearing which can transmit radial forces, the roller elements being arranged in an annular groove that extends from a bore of the second part of the outer ring,
wherein the second part of the outer ring comprises at least one mounting orifice that axially extends from the annular groove, the mounting orifice opening out on the radial mounting surface of the second part, each of the at least one mounting orifice having dimensions such that at least one roller element can pass through the mounting orifice, each of the at least one mounting orifice being closed by a plug, and
wherein the second part of outer ring comprises a plurality of mounting orifices.

9. The slewing roller bearing according to claim 8, wherein the first part of outer ring comprises a stepped annular radial surface provided with the radial mounting surface on an outer radial side, and an outer radial raceway for roller elements on an inner radial side.

10. The slewing roller bearing according to claim 8, wherein the slewing roller bearing comprises a second axial thrust bearing with roller elements that is provided axially opposite to the other axial thrust bearing with respect to the radial thrust bearing.

11. The slewing roller bearing according to claim 10, wherein the outer ring is provided with a third part provided with a radial mounting surface that is axially assembled to a second radial mounting surface of the second part, the third part being axially opposite to the first part and comprising a raceway for roller elements of the second axial thrust bearing.

12. A slewing bearing comprising:
an inner ring,
an outer ring provided with at least a first part and a second part that are axially assembled one to another, the first part and the second part each provided with cooperating radial mounting surfaces, the inner ring and outer ring being concentric around a central axis,
at least one row of roller elements arranged between the inner ring and the first part of the outer ring to form an axial thrust bearing which can transmit axial forces, and at least one row of roller elements arranged between the inner ring and the second part of the outer ring to form a radial thrust bearing which can transmit radial forces, the roller elements being arranged in an annular groove that extends from a bore of the second part of the outer ring,
wherein the second part of the outer ring comprises at least one mounting orifice that axially extends from the annular groove, the mounting orifice opening out on the radial mounting surface of the second part, each of the at least one mounting orifice having dimensions such that at least one roller element can pass through the mounting orifice, each of the at least one mounting orifice being closed by a plug, and
wherein the mounting surface of second part of outer ring comprises at least one recess, and the plug comprises at least one radially extending protruding portion arranged within the recess.

13. The slewing roller bearing according to claim 12, wherein the first part of outer ring comprises a stepped annular radial surface provided with the radial mounting surface on an outer radial side, and an outer radial raceway for roller elements on an inner radial side.

14. The slewing roller bearing according to claim 12, wherein the slewing roller bearing comprises a second axial thrust bearing with roller elements that is provided axially opposite to the other axial thrust bearing with respect to the radial thrust bearing.

15. The slewing roller bearing according to claim 14, wherein the outer ring is provided with a third part provided with a radial mounting surface that is axially assembled to a second radial mounting surface of the second part, the third part being axially opposite to the first part and comprising a raceway for roller elements of the second axial thrust bearing.

16. A slewing bearing comprising:
an inner ring,
an outer ring provided with at least a first part and a second part that are axially assembled one to another, the first part and the second part each provided with cooperating radial mounting surfaces, the inner ring and outer ring being concentric around a central axis,
at least one row of roller elements arranged between the inner ring and the first part of the outer ring to form an axial thrust bearing which can transmit axial forces, and at least one row of roller elements arranged between the inner ring and the second part of the outer ring to form a radial thrust bearing which can transmit radial forces, the roller elements being arranged in an annular groove that extends from a bore of the second part of the outer ring,
wherein the second part of the outer ring comprises at least one mounting orifice that axially extends from the annular groove, the mounting orifice opening out on the radial mounting surface of the second part, each of the at least one mounting orifice having dimensions such that at least one roller element can pass through the mounting orifice, each of the at least one mounting orifice being closed by a plug, and
wherein a stepped annular radial surface of the first part of the outer ring does not completely axially overlap the at least one row of roller elements arranged between the inner ring and the first part of the outer ring.

17. The slewing roller bearing according to claim 16, wherein the slewing roller bearing comprises a second axial thrust bearing with roller elements that is provided axially opposite to the other axial thrust bearing with respect to the radial thrust bearing.

18. The slewing roller bearing according to claim 17, wherein the outer ring is provided with a third part provided with a radial mounting surface that is axially assembled to a second radial mounting surface of the second part, the third part being axially opposite to the first part and comprising a raceway for roller elements of the second axial thrust bearing.

* * * * *